United States Patent
Ferron

(12) 
(10) Patent No.: US 7,165,684 B2
(45) Date of Patent: Jan. 23, 2007

(54) HIGH DENSITY BICYCLE STORAGE SYSTEM

(76) Inventor: William J. Ferron, 2075 Le Jardin Ct., Brookfield, WI (US) 53045

( * ) Notice: Subject to any disclaimer, the term of this patent is extended or adjusted under 35 U.S.C. 154(b) by 210 days.

(21) Appl. No.: 10/834,635

(22) Filed: Apr. 29, 2004

(65) Prior Publication Data

US 2004/0226899 A1  Nov. 18, 2004

Related U.S. Application Data

(60) Provisional application No. 60/467,080, filed on May 1, 2003.

(51) Int. Cl.
A44F 7/00 (2006.01)
(52) U.S. Cl. ........................ 211/19; 211/86.01; 211/118
(58) Field of Classification Search ............... 211/17, 211/18, 19, 20, 23, 113, 162, 118, 94.01, 211/94.02, 86.01; 248/215, 692, 690, 237, 248/228.1, 304, 305, 339, 340; 224/924
See application file for complete search history.

(56) References Cited

U.S. PATENT DOCUMENTS

| | | | | |
|---|---|---|---|---|
| 557,567 A | * | 4/1896 | Eddy | 211/17 |
| 576,865 A | * | 2/1897 | Leonhardt | 211/113 |
| 588,542 A | * | 8/1897 | Williams | 211/17 |
| 595,967 A | * | 12/1897 | Parson | 410/3 |
| 621,819 A | | 3/1899 | Ivatt | |
| 624,231 A | | 5/1899 | Martin | |
| 633,806 A | * | 9/1899 | Cifka | 211/17 |
| 636,324 A | * | 11/1899 | Ehrenberg | 312/249.2 |
| 672,070 A | * | 4/1901 | Smith | 211/19 |
| 1,232,501 A | * | 7/1917 | Colen | 211/19 |
| 1,265,091 A | * | 5/1918 | Kinnard | 108/102 |
| 1,546,276 A | * | 7/1925 | Woltz | 211/94.02 |
| 2,587,150 A | * | 2/1952 | Hansen et al. | 248/58 |
| 2,699,873 A | * | 1/1955 | Ballard | 211/113 |
| 2,757,804 A | * | 8/1956 | Sadwin | 211/94.01 |
| 2,771,196 A | * | 11/1956 | Scheuermann | 211/94.02 |
| 2,788,132 A | * | 4/1957 | Dewey | 211/94.02 |
| 2,975,949 A | * | 3/1961 | Lutsky | 223/91 |
| 3,069,020 A | * | 12/1962 | Sans | 211/162 |
| 3,162,417 A | * | 12/1964 | Briggs | 248/345.1 |
| 3,217,893 A | * | 11/1965 | Fleischman | 211/94.02 |
| 3,770,133 A | * | 11/1973 | Kolker | 211/19 |
| 3,872,972 A | * | 3/1975 | Cummins et al. | 211/17 |
| 3,901,421 A | * | 8/1975 | Kalicki et al. | 224/310 |
| 3,924,751 A | * | 12/1975 | Ballenger | 211/17 |
| 3,941,406 A | * | 3/1976 | Eggleston | 410/3 |
| 4,116,341 A | * | 9/1978 | Hebda | 211/17 |
| 4,552,270 A | * | 11/1985 | Lentz et al. | 211/17 |
| 4,579,262 A | * | 4/1986 | Keenan et al. | 223/85 |
| 4,955,489 A | * | 9/1990 | Allen | 211/151 |
| 5,067,620 A | * | 11/1991 | Norrie | 211/113 |
| 5,086,930 A | * | 2/1992 | Saeks | 211/17 |

(Continued)

Primary Examiner—Jennifer E. Novosad
(74) Attorney, Agent, or Firm—Boyle Fredrickson Newholm Stein & Gratz S.C.

(57) ABSTRACT

A ceiling mount bicycle rack provides for easy loading through the use of downwardly transversely opening wheel hooks that may receive the tires of a bicycle when flipped about the bicycle's upper structure by a user through a gentle arc. After installation on the rack, the bicycle may be slid along longitudinal tracks for storage in a more compact configuration in a less accessible location.

7 Claims, 2 Drawing Sheets

U.S. PATENT DOCUMENTS

| | | | |
|---|---|---|---|
| 5,092,504 A * | 3/1992 | Hannes et al. | 224/403 |
| 5,183,162 A | 2/1993 | Ritzenthaler | |
| 5,275,319 A * | 1/1994 | Ruana | 224/316 |
| 5,402,979 A * | 4/1995 | Bellamy | 248/318 |
| 5,460,274 A * | 10/1995 | Kramer | 211/17 |
| 5,501,345 A * | 3/1996 | Hilstolsky et al. | 211/113 |
| 5,709,521 A * | 1/1998 | Glass et al. | 414/462 |
| 5,749,474 A * | 5/1998 | Woodcock | 211/18 |
| 5,794,793 A * | 8/1998 | Frederick | 211/20 |
| 5,820,002 A * | 10/1998 | Allen | 224/324 |
| 5,845,788 A * | 12/1998 | Robolin | 211/17 |
| 5,848,708 A * | 12/1998 | Edwards | 211/17 |
| 5,908,120 A * | 6/1999 | Yates et al. | 211/119 |
| 5,941,542 A * | 8/1999 | Kalman | 280/38 |
| 5,960,967 A * | 10/1999 | Neil | 211/94.01 |
| 5,988,403 A * | 11/1999 | Robideau | 211/20 |
| 6,145,678 A * | 11/2000 | Morrison | 211/113 |
| 6,149,039 A * | 11/2000 | Englander | 224/310 |
| 6,237,781 B1 * | 5/2001 | Dahl | 211/17 |
| 6,719,158 B1 * | 4/2004 | Goldberg | 211/123 |
| 2002/0053581 A1 * | 5/2002 | Peschmann et al. | 224/319 |
| 2003/0071097 A1 * | 4/2003 | Dean | 224/319 |
| 2004/0050807 A1 * | 3/2004 | Cheng | 211/17 |
| 2004/0060878 A1 * | 4/2004 | Ho | 211/17 |
| 2005/0161417 A1 * | 7/2005 | Lawson et al. | 211/94.02 |

* cited by examiner

HIGH DENSITY BICYCLE STORAGE SYSTEM

CROSS-REFERENCE TO RELATED APPLICATIONS

This application claims the benefit of U.S. Provisional Application 60/467,080 filed May 1, 2003 hereby incorporated by reference.

STATEMENT REGARDING FEDERALLY SPONSORED RESEARCH OR DEVELOPMENT

BACKGROUND OF THE INVENTION

The present invention relates to racks for the storage of bicycles, and in particular, to a simple rack design providing high-density storage for multiple bicycles of differing sizes.

A wide variety of bicycle racks have been developed to provide storage for bicycles. Many of these racks are quite complicated and difficult to manufacture or use. Some racks can store only a single bicycle or otherwise offer little savings in storage space.

What is needed is a space-saving, mechanically simple bicycle rack that works with multiple bicycles of different styles and shapes. Ideally, such a rack would be easily installed and used in a pre-existing structure, such as a garage.

BRIEF SUMMARY OF THE INVENTION

In a principle embodiment, the present invention provides a bicycle rack using an overhead sliding track. The bicycles are inverted for storage, held by their wheels on hooks hanging from the track. The wheel hooks open from the side to allow the bicycles to be installed and removed by lifting and rotating the bicycle from the side of the bicycle, avoiding contact between the rider and the bicycle wheels. The sliding track allows the bicycles to be loaded and unloaded from a convenient location with ample space for rotation, and then to be slid out of the way to a compact configuration. Supporting the bicycles by the wheels allows the rack to work with many different bicycle frame styles.

Specifically, a first embodiment of the invention provides a bicycle rack, having at least two longitudinal tracks, each providing multiple captive supports mounted to slide along the longitudinal track, the longitudinal tracks providing an upper surface mountable to an overhead horizontal support surface in a parallel spaced-apart configuration. A set of transverse members attaches to the captive supports to span a separation between the two longitudinal tracks, the transverse members provide wheel grips engaging front and rear wheels, respectively, of an inverted bicycle.

Thus, it is one object of at least one embodiment of the invention to provide a rack that is substantially universal for all bicycle designs. While the frames of bicycles may vary considerably, all bicycles provide contact of their wheels with a horizontal plane, which when inverted, may be mimicked by the wheel grips. The wheel grips may be hooks.

Thus, it is one object of at least one embodiment of the invention to provide a simple supporting structure, that by engaging relatively standard wheel rims, rather than frames, handlebars, seats or other structures, is relatively indifferent to variations in frame design or in differences in seat or handlebar heights. Because the hooks engage the wheels at their edge of the bike, the hooks may be very short, eliminating low-hanging pendant structures. Substantially equal length hooks of short size may be used, avoiding the need for multiple hook adjustments, sizes, and manufacturing expense.

The hooks may be arranged to receive the front and rear wheels in a transverse direction.

Thus, it is one object of at least one embodiment of the invention to provide improved loading of the bike rack. The transverse opening of the wheel hooks and the track structure combine to promote a comfortable loading posture in which the bicycle is swung from one side onto the hooks keeping the wheels away from the user's clothing and avoiding the need to awkwardly straddle the bicycle to lift it into position. The sliding tracks provide sufficient separation between the bicycle being loaded or unloaded and previously stored bicycles, while later allowing the bicycle to be moved into a compact storage configuration against the other bicycles.

The longitudinal tracks may provide an upper surface mountable flush against a support surface in parallel spaced-apart configuration.

Thus, it is one object of at least one embodiment of the invention to provide a track structure that allows the rack to be mounted flush to a ceiling out of the way without the need for intervening hangers.

The sliding captive supports may be wheels held within downwardly facing C-channels of the longitudinal tracks.

Thus it is another object of at least one embodiment of the invention to provide a track that may be readily formed by extrusion or rolling, and a low friction rolling mechanism which may be covered by the track protecting the wheels from dirt and interference.

The wheel hooks may be adjustable in separation.

Another object of at least one embodiment of the invention is, therefore, to accommodate bicycles of different wheelbases.

The longitudinal channel may have end stops preventing wheels from being removed from the channels.

Thus it is another object of at least one embodiment of the invention to allow simple use of the device without concern about the dislodgement of the wheels.

The transverse members attach pivotally to the captive supports.

Thus it is another object of the invention to allow movement of the transverse members from one end without camming of the transverse member or the need to have outrigger structure to hold the transverse member perfectly at right angles to the longitudinal tracks.

These particular objects and advantages may apply to only some embodiments falling within the claims and thus do not define the scope of the invention.

BRIEF DESCRIPTION OF THE DRAWINGS

FIG. 3 is a cross-section along line 3—3 of FIG. 1 showing the support of the transverse bar on a trolley held in a longitudinal track, the latter which may be attached to ceiling joists or the like.

DETAILED DESCRIPTION OF THE PREFERRED EMBODIMENT

Figure 1:
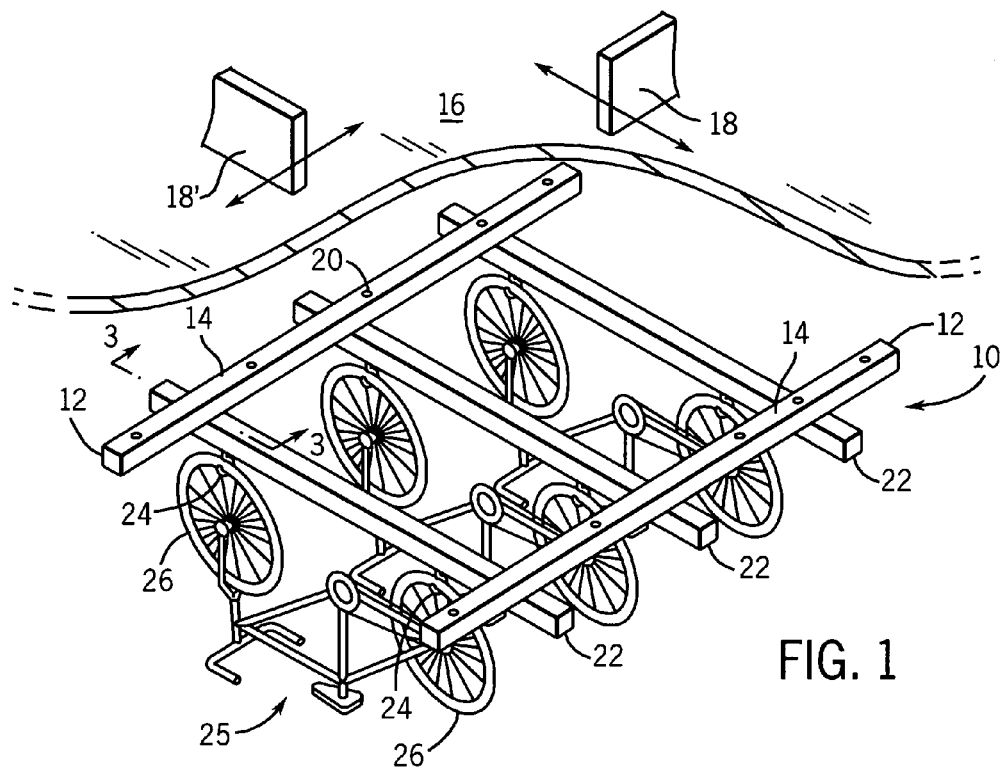
FIG. 1 is a perspective view in cut away of the present invention as mounted to a ceiling showing two different orientations of joists in the ceiling and showing several bicycles inverted beneath the rack as supported by wheel hooks.

Referring now to FIG. 1, a bicycle rack 10 of the present invention may include two longitudinal tracks 12 having upper surfaces 14 which may be mounted adjacent to a ceiling 16.

The longitudinal tracks 12 may be attached, for example, to joists 18 or 18' within the ceiling 16 or exposed without intervening material such as drywall. When the joists 18 are running longitudinally, the individual longitudinal tracks 12 may be aligned with a joist 18 and attached thereto or to stringers inserted between the joists 18. When the joists 18' are running transversely, the longitudinal tracks 12 may be attached spanning the joists 18'. A plurality of holes 20 on the upper surfaces 14 of the longitudinal tracks 12 are spaced to accommodate many joist spacings.

The longitudinal tracks 12, when attached to the ceiling, are spaced apart and parallel. Together, the longitudinal tracks 12 support a number of transverse bars 22 (being one form of a transverse member) extending beneath and generally perpendicularly to the longitudinal tracks 12 to span longitudinal tracks 12. The transverse bars 22 may have a length greater than the separation of the longitudinal tracks 12 to accommodate the trade off between bicycle length and joist separation.

Hanging from each of the transverse bars 22 are wheel hooks 24 that open transversely to engage rims of bicycle wheels 26 of inverted bicycles 25 aligned with the transverse bars 22. While the bicycles 25 are shown with their front wheels all positioned in one direction, either orientation is acceptable and an alternating orientation may be adopted if convenient for closer storage.

Figure 2:
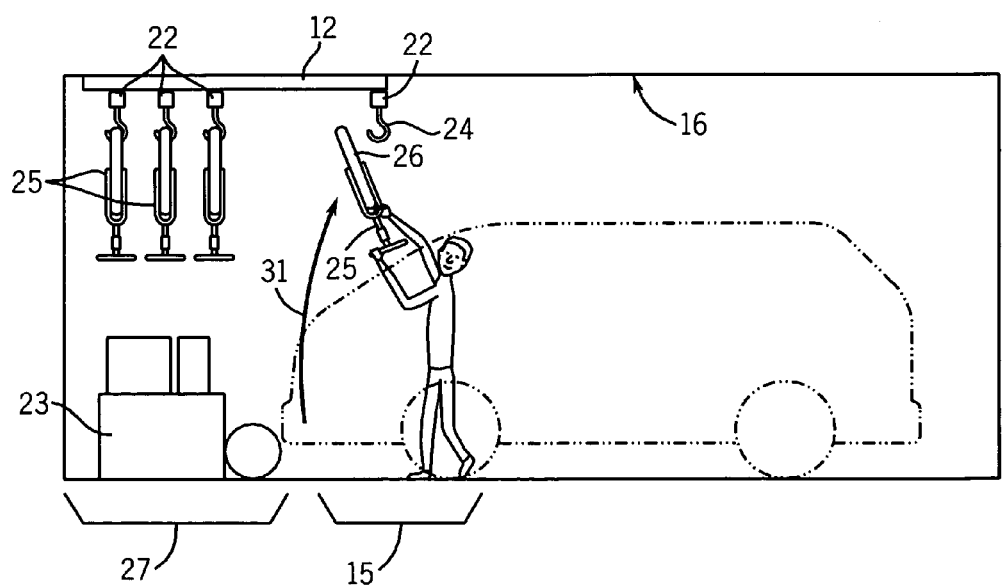
FIG. 2 is a simplified elevational view of a garage showing the loading of a bicycle at a convenient location removed from previously loaded bicycles positioned in a previously unused space over other stored materials on the floor.

Referring now to FIG. 2, the longitudinal tracks 12 may be placed to extend into an unused and possibly otherwise inaccessible storage area 27, for example, over materials 23 stored on the ground, and over an accessible area 15 where a user may stand. In using the rack 10, the user dismounts from the bicycle 25 with the bicycle aligned generally with one transverse bar 22 pulled into the accessible area 15 and the user standing to one side. The user may then lift the bicycle 25 in a flattened arc 31 to engage the wheels 26 with the transversely opening hooks 24 of the displaced transverse bar 22. Interference with the other bicycles 25 is avoided because the other bicycles are removed from the transverse bar 22 being loaded. Once the bicycle 25 is engaged with the wheel hooks 24, the transverse bar 22 may be rolled back toward the other bicycles 25.

Figure 3:
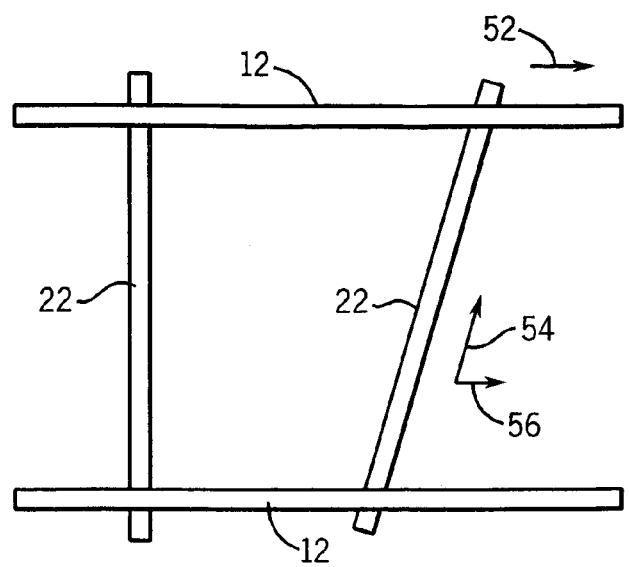

Referring now to FIG. 3, each of the wheel hooks 24 may have a lower bent portion 28 opening on one transverse side for supporting the bicycle wheel 26 with the bent portion 28 passing inside of the rim of the wheel 26 between spokes 33. The wheel hook 24 may also have an upper threaded shank 19 that may be received within a threaded hole 32 in a lower wall 17 of the transverse bar 22.

The transverse bar 22 is attached at its upper wall 36 slidably attached to the longitudinal track 12 as will be described.

Figure 4:
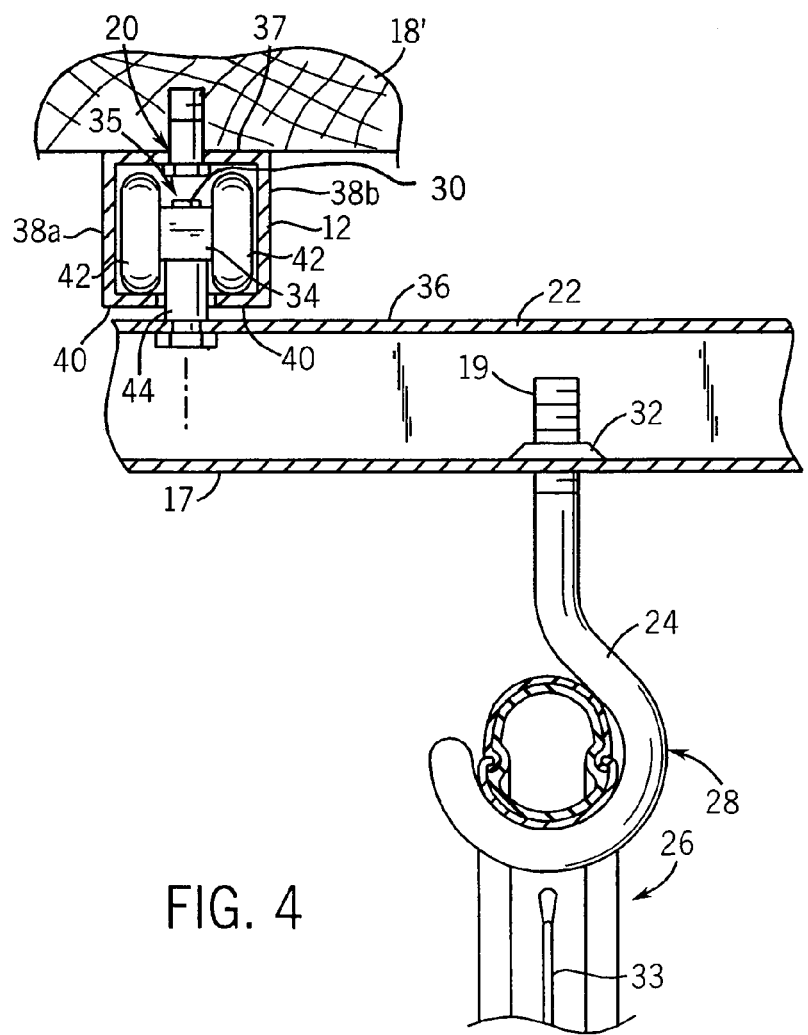
FIG. 4 is a plan view of two transverse bars supported on longitudinal tracks showing camming forces generating when the transverse bar is moved from one end.

Referring now to FIG. 4, the longitudinal track 12 is preferably a C-channel having an upper wall 7 flanked by two vertical sidewalls 38a and 38b extending downward from the upper wall 7 to terminate in horizontal lips 40. A trolley 35 is held in the C-channel and has three side-by-side wheels 42 flanking a trolley body 34 and rotating in a vertical plane as supported by the two horizontal lips 40. The horizontal lips 40 extend toward each other to define a gap therebetween through which a pivoting support 30 (providing one version of a captive support) attached to the trolley body 34 passes. In this way, the trolley 35 may roll transversely within the transverse bar 22 with the pivoting support 30 passing downward without interference.

The pivoting support 30, pivots about a vertical axis, and is pivotally attached to the upper wall 36 of the transverse bar 22 by a bolt or the like. A spacer 44 provides a gap between the lower lips 40 of the longitudinal track 12 and the upper wall 36 of the transverse bar 22 providing sufficient clearance for easy motion. At least two wheels 42 flank the pivoting support 30.

The wheels 42 may be a resilient plastic material for smooth and quiet operation and may have central ball-bearings.

In an alternative embodiment, the transverse bars 22 may be simplified as solid beams with the hooks 24 received within threaded holes drilled on regular periodic locations along the transverse bars 22 to provide for adjustment.

In an alternative embodiment, the longitudinal track 12 may incorporate a sliding block without wheels.

As will be understood from this description, the weight of the bicycles 25 on the wheel hooks 24 will be transmitted through the transverse bars 22 to the trolleys 35 within the longitudinal tracks 12 which may freely roll along the lips 40 of the longitudinal track 12 as supported by the ceiling structure.

Referring momentarily to FIG. 3, low friction wheels 42 on the trolleys 35 within the longitudinal bars 22 and the pivoting support 30 operate to allow the transverse bars 22 to be guided from ends of the transverse bars by a force 52 on one end of a transverse bar 22. Slight amounts of frictional resistance in the longitudinal motion of the transverse bar 22 can cause a canting of the transverse bars 22 shown in exaggerated form in FIG. 7 allowed by the pivoting support 30. That in turn can cause a tension 54 along the transverse bar 22 that resolves itself into a longitudinal force 56 allowing the transverse bar 22 to move because of the low friction trolley 35. The result is that off-center forces on the transverse bars 22 are acceptable, making it easy to move the transverse bars 22 apart from one side of the rack 10 without the need for braces or the like to prevent canting of the transverse bars 22.

It is specifically intended that the present invention not be limited to the embodiments and illustrations contained herein, but include modified forms of those embodiments including portions of the embodiments and combinations of elements of different embodiments as come within the scope of the following claims.

I claim:

1. A bicycle rack assembly comprising:

a bicycle having two wheels held by a frame supporting a seated user when in an upright configuration;

at least two longitudinal tracks, each providing multiple captive supports mounted to slide along the longitudinal track, the longitudinal tracks providing an upper surface mountable against an overhead horizontal support surface in parallel spaced-apart configuration, and the multiple captive supports mounted to slide wholly below the upper surface when the upper surface is mounted against an overhead horizontal support surface;

a set of transverse members each attached to the captive supports of two different longitudinal supports to span a separation between the two longitudinal tracks and be held by the captive supports; and at least two wheel grips attached to each of the transverse members to hang down from and be supported by the transverse members, the wheel grips being hooks opening in a longitudinal direction and spaced to receive and hold the wheels of the bicycle when the bicycle is in an inverted configuration hanging by its wheels from the hooks beneath and aligned with the transverse member.

2. The bicycle rack of claim 1 wherein the hooks extend less than twelve inches below the transverse members.

3. The bicycle rack of claim 1 wherein the transverse members support the wheel grips at adjustable separation.

4. The bicycle rack of claim 3 wherein the transverse members provide holes spaced along the transverse members to selectively receive shanks of hooks providing the wheel grips.

5. The bicycle rack of claim 1 wherein the captive supports are held within downwardly facing C-channels forming the longitudinal tracks.

6. The bicycle rack of claim 1 wherein the captive supports are wheeled trolleys held within C-channels.

7. The bicycle rack of claim 1 wherein the transverse members attach pivotally to the captive supports.

* * * * *